US011921005B2

(12) United States Patent
Nair et al.

(10) Patent No.: US 11,921,005 B2
(45) Date of Patent: Mar. 5, 2024

(54) SYSTEM, APPARATUS AND METHOD FOR ESTIMATING REMAINING USEFUL LIFE OF A BEARING

(71) Applicants: Sudev Nair, Karnataka (IN); Iniyan Ramasamy, Tamil Nadu (IN)

(72) Inventors: Sudev Nair, Karnataka (IN); Iniyan Ramasamy, Tamil Nadu (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/459,326

(22) Filed: Aug. 27, 2021

(65) Prior Publication Data
US 2022/0065748 A1 Mar. 3, 2022

(30) Foreign Application Priority Data

Aug. 28, 2020 (EP) .................................... 20193456

(51) Int. Cl.
*G01M 13/045* (2019.01)
*G01N 19/08* (2006.01)

(52) U.S. Cl.
CPC .......... *G01M 13/045* (2013.01); *G01N 19/08* (2013.01)

(58) Field of Classification Search
None
See application file for complete search history.

(56) References Cited

U.S. PATENT DOCUMENTS

| 10,436,766 B1* | 10/2019 | Bayyouk | F04B 53/18 |
| 2009/0319827 A1* | 12/2009 | Nakazato | G03G 15/5079 714/E11.02 |
| 2015/0262060 A1* | 9/2015 | Husain | G06N 3/08 706/21 |
| 2019/0303791 A1* | 10/2019 | Yoshikawa | G06Q 50/06 |

FOREIGN PATENT DOCUMENTS

| EP | 0297729 A2 | 1/1989 |
| EP | 3855153 A1 * | 7/2021 |
| WO | 2020040280 A1 | 2/2020 |

OTHER PUBLICATIONS

European Search Report for European Application No. 20193456.9-1001 dated Feb. 23, 2021.

* cited by examiner

*Primary Examiner* — Raul J Rios Russo
*Assistant Examiner* — Carl F. R. Tchatchouang
(74) *Attorney, Agent, or Firm* — Lempia Summerfield Katz LLC

(57) ABSTRACT

A system, apparatus, and method for estimating remaining useful life of a bearing are provided. The method includes receiving a request for analyzing a defect in the bearing from a source. The request includes operational data associated with the bearing. An impact of the defect on the bearing is monitored over a period of time. A time period during which the impact of the defect on the bearing is higher than a threshold range is determined using a machine learning model. A severity of the impact associated with the defect is computed during the time period. A remaining useful life of the bearing is determined based on the severity and the operational data during the time period.

12 Claims, 12 Drawing Sheets

SYSTEM, APPARATUS AND METHOD FOR ESTIMATING REMAINING USEFUL LIFE OF A BEARING

This application claims the benefit of European Patent Application Number EP 20193456.9, filed on Aug. 28, 2020, which is hereby incorporated by reference in its entirety.

BACKGROUND

The present embodiments relate to a field of bearing monitoring systems and, more particularly, relate to estimating remaining useful life of a bearing.

Bearings are used in machinery in industry for the purpose of reducing friction between two rotating parts. These bearings also restrict relative motion between the rotating parts to a desired motion. However, bearings may fail unexpectedly due to factors such as poor lubrication and contamination within a structure of the bearing. For example, lubrication within the bearing may fail during an operational phase of the bearing due to excessive temperatures. Contamination may occur due to entry of foreign particles, moisture, etc. into the structure of the bearing. The above factors lead to failure modes such as corrosion, spatting, pitting, electrical erosion, plastic deformation, and the like in the bearing. As a result, an expected fatigue life of the bearing assembly is reduced, and eventually, failures occur. Consequently, bearing failures may cause unexpected downtime of the machinery, resulting in production and financial loss. In safety-critical applications, bearing failures may also put human lives at risk.

SUMMARY AND DESCRIPTION

The scope of the present invention is defined solely by the appended claims and is not affected to any degree by the statements within this summary.

In light of the above, there exists a need for estimating remaining useful life of a bearing.

The present embodiments may obviate one or more of the drawbacks or limitations in the related art. For example, a system, apparatus, and method for estimating remaining useful life of a bearing are provided.

In one embodiment, a method for estimating remaining useful life of a bearing includes receiving a request for analyzing a defect in the bearing. The term 'defect' as used herein refers to any structural deformities within the bearing that result in abnormal operation of the bearing. The request includes operational data associated with the bearing. In one embodiment, the operational data includes an output of at least one sensing unit associated with the bearing in real-time. The term 'sensing unit' as used herein includes both transducers and sensors. In addition to the above, the request may also specify one or more bearing parameters.

The present embodiments facilitate estimation of remaining useful life of bearings of any size based on the respective operational data.

The method includes monitoring an impact of the defect on the bearing over a period of time. The term 'impact' as used herein refers to deviations from a normal operation of the bearing resulting from the defect. In an embodiment, in monitoring the impact of the defect, the method includes monitoring anomalies in the output of the at least one sensing unit. The present embodiments may facilitate continuous monitoring of impacts due to defects in a bearing in real-time.

The method includes determining a time period during which the impact of the defect on the bearing is higher than a threshold range, using a machine learning model. In an embodiment, determining the time period includes analyzing the operational data associated with the bearing using the machine learning model for determining the time period.

In one embodiment, computation of the time period is performed using a machine learning model. As a result, smaller time periods resulting from low energy impacts may also be detected.

The method includes computing a severity of the impact associated with the defect during the time period. In one embodiment, in computing the severity, the method includes computing a defect size corresponding to the defect based on a duration of the time period. The term 'defect size' as used herein refers to a distance travelled by a rolling element, during operation of the bearing, between entering and leaving of the defect.

The present embodiments use a defect size to compute the severity of an impact associated with the defect.

The method includes determining the remaining useful life of the bearing based on the severity and the operational data during the time period. The term 'remaining useful life' as used herein refers to a duration between initiation of a detectable failure mode and a functional failure of the bearing. In an embodiment, in determining the remaining useful life, the method includes computing a dynamic parameter associated with the bearing based on the defect size and the operational data using a virtual model of the bearing. In one embodiment, the dynamic parameter is a dynamic load on the bearing. The dynamic parameter may also be associated with contact force or contact stress associated with the rolling element upon coming in contact with the defect.

In an embodiment, the virtual model is built based on simulation data, experimental data, and mathematical models associated with a plurality of other bearings. Further, a remaining useful life model of the bearing is configured based on the dynamic parameter. The remaining useful life model is a dynamic model that relates the dynamic parameter to a life of the bearing. Further, the remaining useful life of the bearing is computed based on the configured remaining useful life model and the operational data.

The present embodiments facilitate using defect size to determine a dynamic parameter that influences degradation of the bearing.

The method includes generating a notification indicating the remaining useful life of the bearing on an output device. In addition to the remaining useful life, the notification may further include diagnostic information associated with the bearing. For example, the diagnostic information may indicate the defect size, the RUL curve, and an indication of the state of degradation on the RUL curve.

In one embodiment, an apparatus for estimating remaining useful life of a bearing is provided. The apparatus includes one or more processing units and a memory unit communicatively coupled to the one or more processing units. The memory unit includes a bearing management module stored in the form of machine-readable instructions executable by the one or more processing units. The bearing management module is configured to perform method acts described above. The execution of the condition management module may also be performed using co-processors such as Graphical Processing Unit (GPU), Field Programmable Gate Array (FPGA), or Neural Processing/Compute Engines.

According to an embodiment, the apparatus may be an edge computing device. As used herein, "edge computing" refers to computing environment that is capable of being performed on an edge device (e.g., connected to sensing units in an industrial setup on one end and to one or more remote servers such as for computing server(s) or cloud computing server(s) on the other end), which may be a compact computing device that has a small form factor and resource constraints in terms of computing power. A network of the edge computing devices may also be used to implement the apparatus. Such a network of edge computing devices is referred to as a fog network.

In another embodiment, the apparatus is a cloud computing system having a cloud computing based platform configured to provide a cloud service for analyzing defects in a bearing. As used herein, "cloud computing" refers to a processing environment including configurable computing physical and logical resources (e.g., networks, servers, storage, applications, services, etc.) and data distributed over the network (e.g., the Internet). The cloud computing platform may be implemented as a service for analyzing defects in a bearing. In other words, the cloud computing system provides on-demand network access to a shared pool of the configurable computing physical and logical resources. The network is, for example, a wired network, a wireless network, a communication network, or a network formed from any combination of these networks.

In an embodiment, a system for estimating remaining useful life of a bearing is provided. The system includes one or more sources capable of providing operational data associated with a bearing and an apparatus as described above, communicatively coupled to the one or more sources. The term 'sources' as used herein refers to electronic devices configured to obtain and transmit the operational data to the apparatus. Non-limiting examples of sources include sensing units, controllers, and edge devices.

In one embodiment, a computer-readable medium (e.g., a non-transitory computer-readable storage medium), on which program code sections of a computer program are saved is provided. The program code sections are loadable into and/or executable by a processor that performs the method as described above when the program code sections are executed.

BRIEF DESCRIPTION OF THE DRAWINGS

The illustrated embodiments are intended to illustrate, but not limit the invention.

DETAILED DESCRIPTION

Figure 1A:
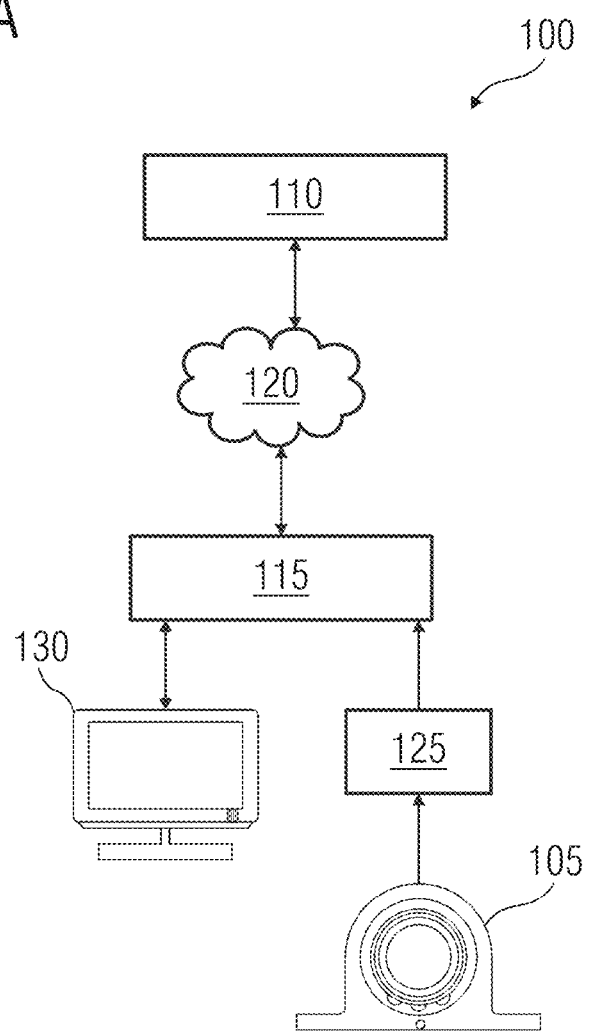
FIG. 1A illustrates a block-diagram of a system for estimating remaining useful life of a bearing, in accordance with an embodiment.

Hereinafter, embodiments for carrying out the present invention are described in detail. The various embodiments are described with reference to the drawings, where like reference numerals are used to refer to like elements throughout. In the following description, for purpose of explanation, numerous specific details are set forth in order to provide a thorough understanding of one or more embodiments. Such embodiments may be practiced without these specific details.

FIG. 1A illustrates a block-diagram of a system 100 for estimating remaining useful life of a bearing 105, in accordance with an embodiment. For example, the bearing 105 may be part of rotating equipment such as an industrial motor (not shown). Non-limiting examples of bearings include deep groove ball bearings, cylindrical roller bearings, a tapered roller bearing, a thrust bearing, an angular contact ball bearing, a needle ball bearing, and the like. In the present embodiment, the bearing 105 includes an inner race, an outer race, and a plurality of rolling elements disposed in a gap between the inner race and the outer race. The bearing 105 further includes a cage positioned between the inner race and the outer race for maintaining a symmetric radial gap between the rolling elements. An example of a bearing is described later in the present disclosure with reference to FIG. 2A.

The system 100 includes an apparatus 110 communicatively coupled to one or more edge devices 115. The one or more edge devices 115 are connected to the apparatus 110 via a network 120 (e.g., local area network (LAN), wide area network (WAN), WiFi, etc.). Each of the edge devices 115 is configured to receive sensor data from at least one sensing unit 125 associated with the bearing 105. The at least one sensing unit 125 may include, for example, a vibration sensor, a velocity sensor, an acceleration sensor, and a force sensor. The sensor data corresponds to an output of the at least one sensing unit 125. For example, the output from the at least one sensing unit 125 may be in the form of vibration data, velocity data, acceleration data, or force data. In an embodiment, the sensor data is obtained through data acquisition interfaces on the edge device 115. The edge device 115 provides the sensor data in real-time to the apparatus 110.

In addition, the edge device 115 is also configured to provide one or more bearing parameters associated with the bearing 105 to the apparatus 110. The one or more bearing parameters include, but are not limited to, a standard bearing number, a ball size, bearing static load, density of material, angular velocity, internal clearance, bearing diameter, number of rolling elements, radius of rolling element, diameter of inner race, diameter of outer race, fatigue load limit, and type of lubricant used in the bearing 105. The standard bearing number is indicative of certain specifications such as a ball size, bearing static load, density of material, internal clearance, bearing diameter, number of rolling elements, radius of rolling element, diameter of inner race, diameter of outer race, fatigue load limit, bearing width and the like, as provided by a manufacturer of the bearing 105. Therefore, in an embodiment, the standard bearing number associated with the bearing 105 may be provided in place of the above bearing parameters.

The one or more bearing parameters may be stored in a memory of the edge device 115 or may be input to the edge device 115 by an operator. For example, the edge device 115 may be communicatively coupled to a client device 130. Non-limiting examples of client devices include, personal computers, workstations, personal digital assistants, human machine interfaces. The client device 130 may enable the user to input values for the one or more bearing parameters through a web-based interface. Upon receiving the one or more bearing parameters from the user, the edge device 115 transmits a request for analysing a defect in the bearing 105 to the apparatus 110. The defects occur due to initiation of a failure mode in the bearing 105. Non-limiting examples of failure modes include spatting, pitting, plastic deformation, abrasion, electrical erosion, and corrosion typically on an outer race of the bearing 105. The defects may occur due to presence of contaminants or due to properties of a lubricant used within the bearing 105. The request includes the one or more bearing parameters along with the sensor data.

In the present embodiment, the apparatus 110 is deployed in a cloud computing environment. As used herein, "cloud computing environment" refers to a processing environment including configurable computing physical and logical resources (e.g., networks, servers, storage, applications, services, etc.) and data distributed over the network 120 (e.g., the Internet). The cloud computing environment provides on-demand network access to a shared pool of the configurable computing physical and logical resources. The apparatus 110 may include a module that estimates remaining useful life of a given bearing based on the corresponding sensor data and the one or more bearing parameters. Additionally, the apparatus 110 may include a network interface for communicating with the one or more edge devices 115 via the network 120.

Figure 1B:
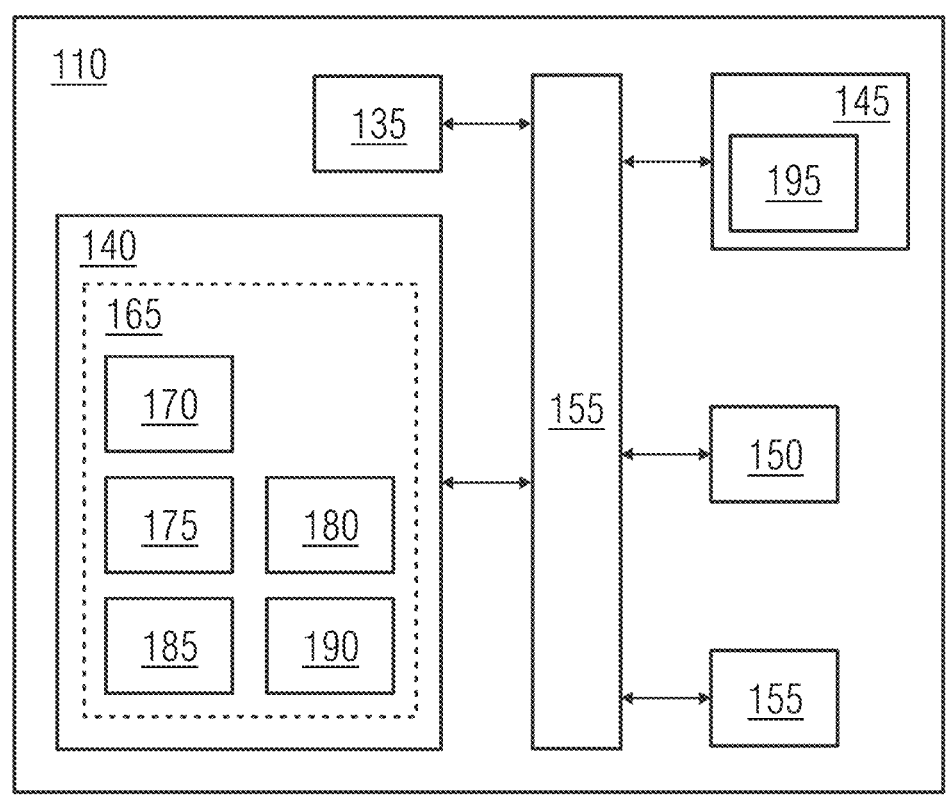
FIG. 1B illustrates a block-diagram of an apparatus for estimating remaining useful life of a bearing, in accordance with an embodiment.

The apparatus 110 includes a processing unit 135, a memory unit 140, a storage unit 145, a communication unit 150, the network interface 155, and a standard interface or bus 160, as shown in FIG. 1B. The apparatus 110 may be a computer, a workstation, a virtual machine running on host hardware, a microcontroller, or an integrated circuit. As an alternative, the apparatus 110 may be a real or a virtual group of computers (the technical term for a real group of computers is "cluster", the technical term for a virtual group of computers is "cloud").

The term 'processing unit' 135, as used herein, may be any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 135 may also include embedded controllers, such as generic or programmable logic devices or arrays, application specific integrated circuits, single-chip computers, and the like. In general, a processing unit 135 may include hardware elements and software elements. The processing unit 135 may be configured for multithreading (e.g., the processing unit 135 may host different calculation processes at the same time, executing either in parallel or switching between active and passive calculation processes).

The memory unit 140 may be volatile memory and non-volatile memory. The memory unit 140 may be coupled for communication with the processing unit 135. The processing unit 135 may execute instructions and/or code stored in the memory unit 140. A variety of computer-readable storage media may be stored in and accessed from the memory unit 140. The memory unit 140 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like.

The memory unit 140 includes a bearing management module 165 in the form of machine-readable instructions on any of the above-mentioned storage media and may be in communication to and executed by the processing unit 135. The bearing management module 165 includes a preprocessing module 170, an impact monitoring module 175, a severity computation module 180, a life estimation module 185, and a notification module 190. The preprocessing module 170 is configured for receiving a request for analyzing a defect in the bearing 105. The request includes the operational data associated with the bearing 105 and the one or more bearing parameters. The impact monitoring module 175 is configured for monitoring an impact of the defect on the bearing 105 over a period of time. The impact monitoring module 175 is further configured for determining a time period during which the impact of the defect on the bearing 105 is higher than a threshold range, using a machine learning model. The severity computation module 180 is configured for computing a severity of the impact associated with the defect during the time period. The life estimation module 185 is configured for determining a remaining useful life of the bearing 105 based on the severity and the operational data during the time period. The notification module 190 is configured for generating a notification indicating the remaining useful life of the bearing 105 on an output device. In the present embodiment, the output device may be the client device 130.

The storage unit 145 includes a non-volatile memory that stores default bearing parameters associated with standard bearing numbers. The storage unit 145 includes a database 195 that includes default values of bearing parameters and one or more look-up tables including predetermined values for factors that vary with operating conditions of the bearing 105. The bus 160 acts as interconnect between the processing unit 135, the memory unit 140, the storage unit, and the network interface 155. The communication unit 150 enables the apparatus 110 to receive requests from the one or more edge devices 115. The communication module may support different standard communication protocols such as Transport Control Protocol/Internet Protocol (TCP/IP), Profinet, Profibus, and Internet Protocol Version (IPv).

Those of ordinary skilled in the art will appreciate that the hardware depicted in FIGS. 1A and 1B may vary for different implementations. For example, other peripheral devices such as an optical disk drive and the like, Local Area Network (LAN)/Wide Area Network (WAN)/Wireless (e.g., Wi-Fi) adapter, graphics adapter, disk controller, input/ output (I/O) adapter, network connectivity devices also may be used in addition or in place of the hardware depicted. The depicted example is provided for the purpose of explanation only and is not meant to imply architectural limitations with respect to the present disclosure.

Figure 2A:
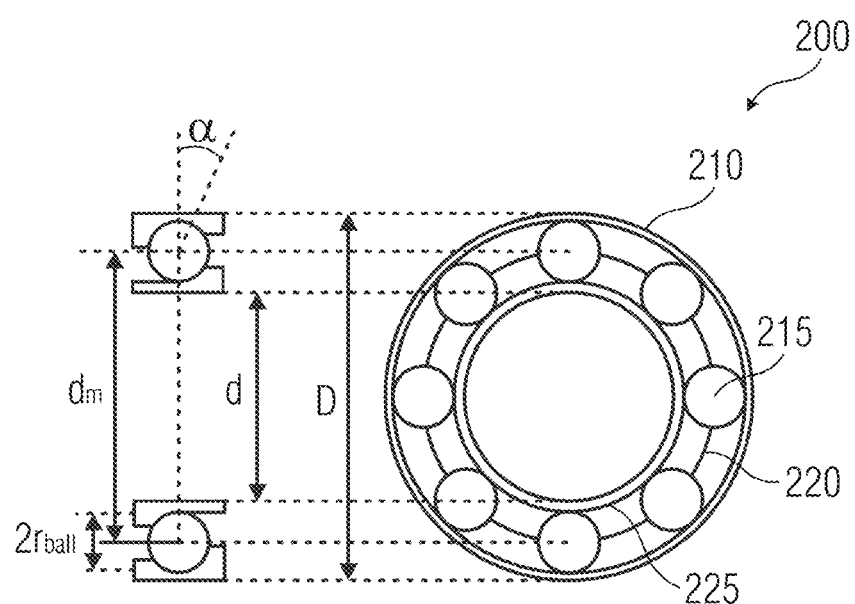
FIG. 2A illustrates exemplary structure of a ball bearing.
Figure 2B:
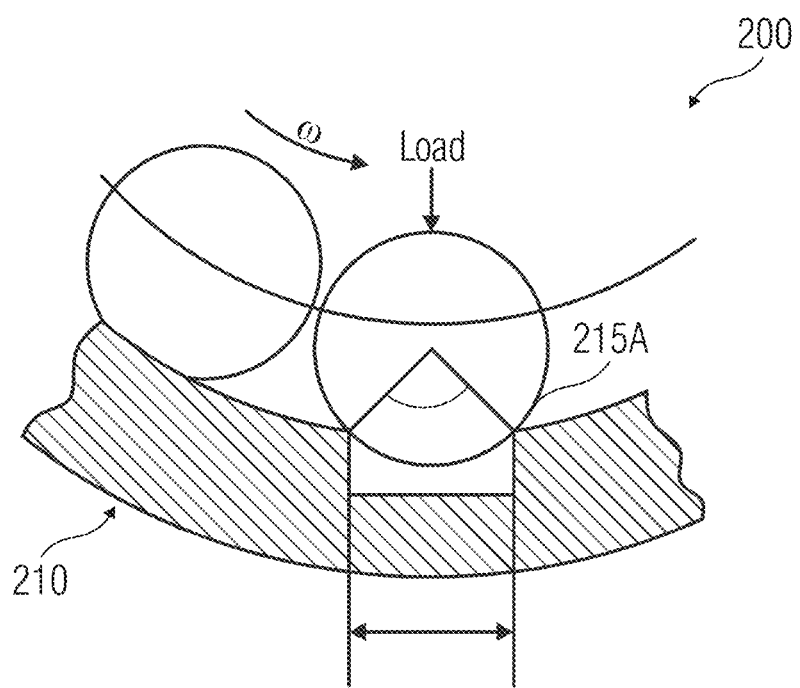
FIG. 2B illustrates an exemplary defect in an outer race of the ball bearing.

FIG. 2A illustrates structure of a ball bearing 200. The ball bearing 200 includes an outer race 210 of diameter D, a plurality of balls 215 each of radius $r_{ball}$, a cage 220, and an inner race 225 of diameter d. The plurality of balls 215 are disposed in a gap between the outer race 210 and the inner race 225. The cage 220 maintains a symmetric radial spacing between the balls 215. FIG. 2B illustrates a defect of defect size $d_{defect}$ on a wall of the outer race 210 in contact with the balls 215. In the present example, the defect is an indentation in the outer race 210 due to pitting. The defect size may be defined as a distance travelled by a ball 215 of the ball bearing 200 between entering and leaving the defect. The defect subtends an angle $\theta_{center}$ at the center of a ball 215A among the plurality of balls 215 as shown. The angular velocity of a shaft on which the ball bearing 200 is mounted is indicated as ω.

Figure 3:
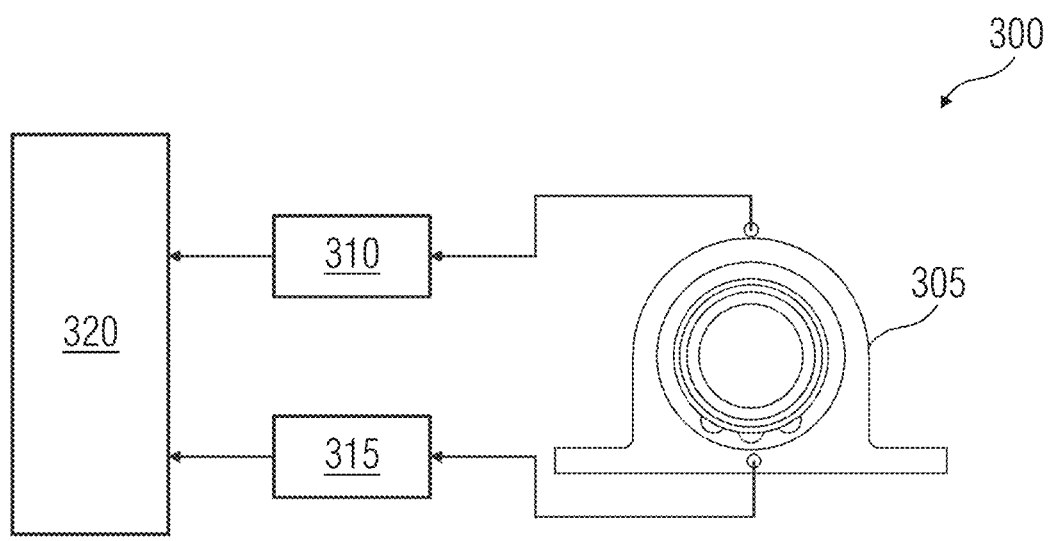
FIG. 3 illustrates an experimental test set-up for building a virtual model of a bearing, in accordance with an embodiment.

FIG. 3 illustrates an experimental test set-up 300 for building a virtual model of a bearing, in accordance with an embodiment. In the present embodiment, the virtual model corresponds to ball bearings. The virtual model may be built for other types of bearings in a similar manner.

The virtual model may be based on physics-based models, Computer-Aided Design (CAD) models, Computer-Aided Engineering (CAE) models, one-dimensional (1D) models, two-dimensional (2D) models, three-dimensional (3D) models, finite-element (FE) models, descriptive models, meta-models, stochastic models, parametric models, reduced-order models, statistical models, heuristic models, prediction models, ageing models, machine learning models, Artificial Intelligence models, deep learning models, system models, surrogate models, other models, or any combination thereof.

In the present embodiment, the virtual model is built based on simulation data, experimental data, and mathematical data associated with a plurality of bearings under a plurality of operating conditions. The plurality of operating conditions may be generated based on a Design Of Experiments (DOE) for varying values of load, angular velocity, and defect size. The term 'load' may indicate bearing static load. For example, the defect size may be, for example, 0.1 mm, 0.2 mm, 1 mm, 2 mm, 3 mm, 4 mm, or 5 mm. The load may be, for example, 400 N or 500 N. The angular velocity may be, for example, 1000 rad/s, 1200 rad/s, 1400 rad/s, or 1600 rad/s. In the present embodiment, simulation data, experimental data, and mathematical data associated with three standard ball bearings are used. For example, a first bearing among the three bearings may have a standard bearing number 6205, a second bearing may have a standard bearing number 6213, and a third bearing may have a standard bearing number 6319.

The experimental set-up 300 includes a bearing 305, at least one force sensor 310, and at least one vibration sensor 315 attached to the bearing 305. The force sensor 310 and the vibration sensor 315 are communicatively coupled to an apparatus 320, similar to the apparatus 110. In an embodiment, the apparatus 320 may include a data acquisition interface for receiving signals from the force sensor 310 and the vibration sensor 315. The bearing 305 is mounted on a rotating shaft. In an example, the rotating shaft is part of a rotating equipment. Further, one or more defects are artificially introduced into an outer race of the bearing 305. Each of the defects is associated with a known defect size as specified in the operating conditions. The force sensor 310 is configured to measure an impact force resulting from a ball of the bearing passing through the defect. The term 'impact force', as used herein, refers to a contact force experienced by the ball upon entering an edge of the defect. In an example, the force sensor 310 is a triaxial piezoelectric crystal. The vibration sensor 315 is configured to measure vibrations or acceleration values resulting from the ball passing through the defect. In an example, the vibration sensor 315 is an accelerometer. Further, the experimental data is recorded. The experimental data includes the impact force measured by the force sensor 310 and respective acceleration values measured by the vibration sensor 315 for each of the operating conditions. Similarly, the experimental data corresponding to each of the three bearings is recorded.

The simulation data is generated by simulating a behavior of the bearings based on a multi-physics simulation model. The operating conditions may be provided as inputs to the multiphysics simulation model in a simulation environment. For example, the simulation environment may be provided by a computer-aided simulation tool on the apparatus 320. The simulation model includes Finite-Element models of an outer race, a cage, a plurality of rolling elements, an inner race, and a shield associated with the bearing. In the present example, the rolling elements are balls. Further, the simulation model corresponding to each of the standard ball bearings is configured to model a defect in the outer race of a defect size specified in the operating conditions. For example, the defect may be associated with spatting, pitting, plastic deformation, abrasion, electrical erosion or corrosion, or any combination thereof.

Figure 4A:
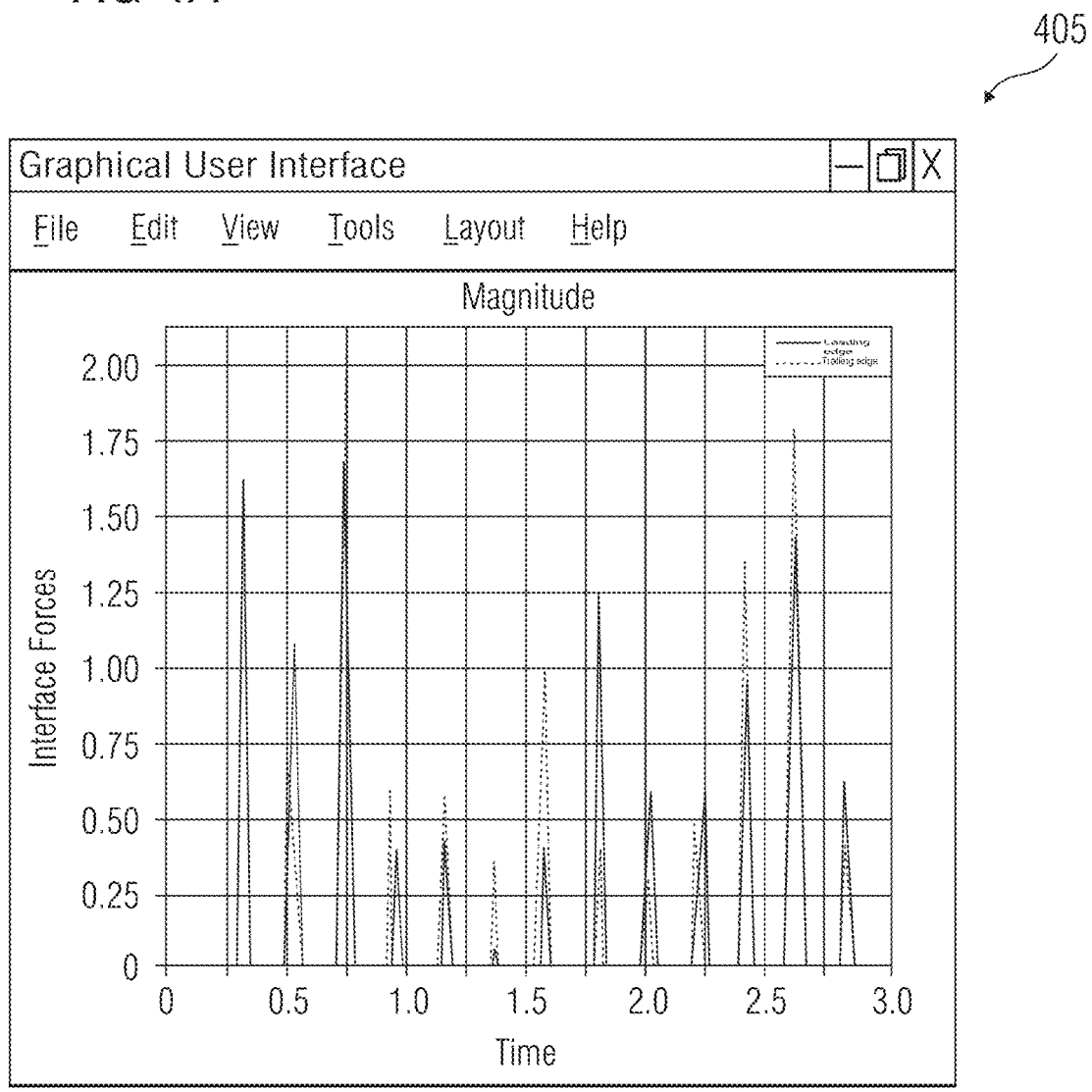
FIG. 4A is a Graphical User Interface view showing an example of a simulation result generated for a bearing, in accordance with an embodiment.
Figure 4B:
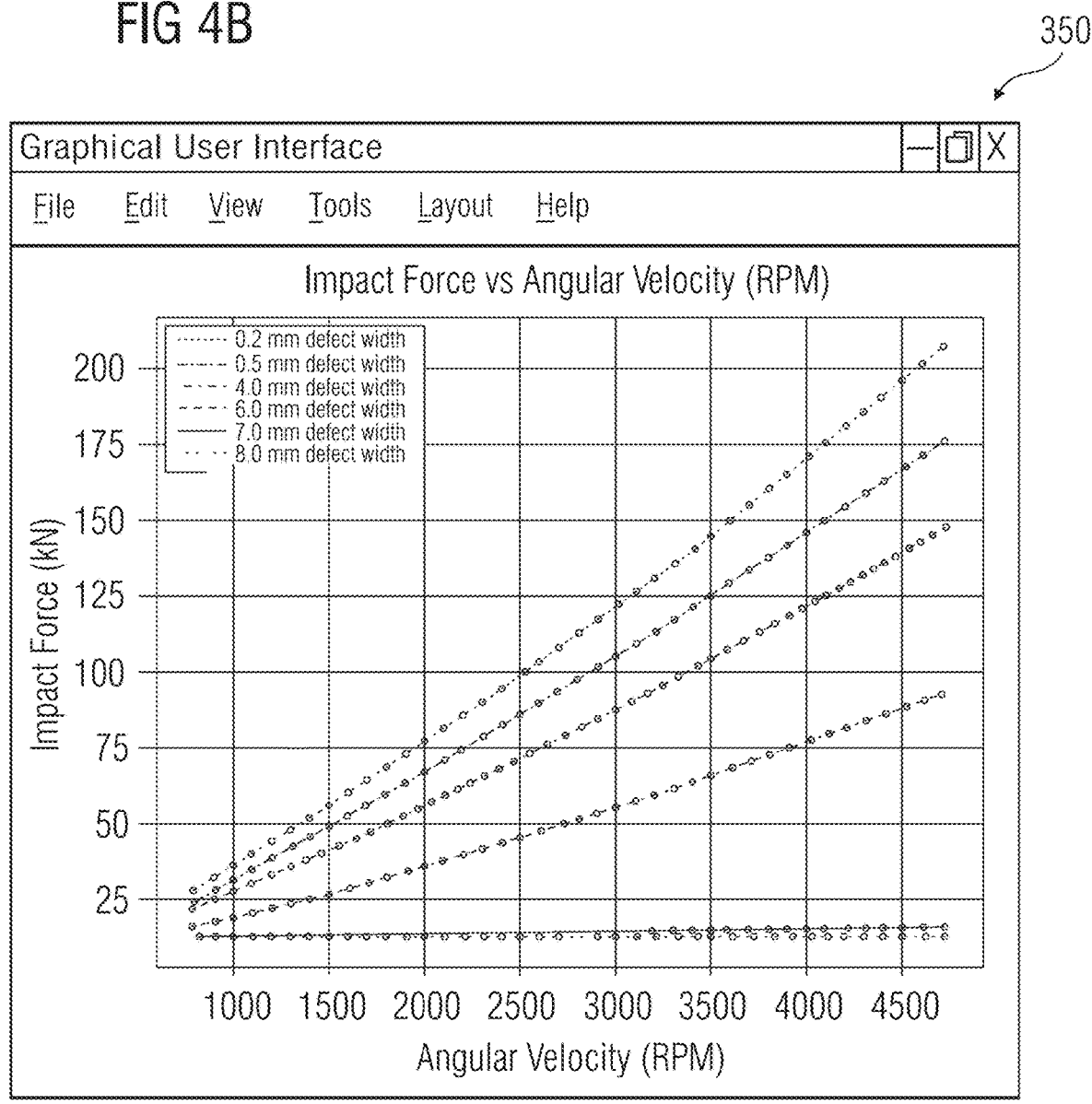
FIG. 4B is a Graphical User Interface view showing variations in experimental values of maximum impact force with angular velocity, in accordance with an embodiment.

Based on the configured simulation model, simulation instances are generated. The simulation instances are executed in the simulation environment to generate the simulation data for the bearing corresponding to each of the simulation data that is generated for the same operating conditions used for generating the experimental data. The simulation data includes values of simulated maximum impact force corresponding to each of the operating conditions. Similarly, simulation data is generated for each of the three bearings. FIG. 4A is a GUI view 405 indicating an example of a simulation result for a bearing. The simulation result indicates variation in impact forces (indicated as interface force in FIG. 4A) with time for a simulation instance. For example, continuous lines indicate impact forces at a leading edge of the defect, and discrete lines indicate impact forces at a trailing edge of the defect. The leading edge may correspond to a point on the outer race at which the rolling element of the bearing enters the defect. The trailing edge corresponds to a point on the outer race at which the rolling element of the bearing leaves the defect. Similarly, FIG. 4B is a GUI view 410 showing defect profiles indicating variations in experimental values of maximum impact force with angular velocity. The defect profiles correspond to different defect sizes 0.2 mm, 0.5 mm, 4 mm, 6 mm, 7 mm, and 8 mm. As shown, the maximum impact force increases with increasing defect size and also with increasing angular velocity.

The mathematical data is generated by the apparatus 320 based on a mathematical model of a bearing. The mathematical model is of the form:

$$p_1 \frac{k_c}{m_b} x_{imax}^{5/2} - p_2 \frac{Q_\varphi}{m_b} \cos\left(\frac{\theta_b}{2}\right) x_{imax} = (r_b \omega_f \sin\theta_b)^2 \quad (1)$$

which may be rearranged as:

$$p_1 \frac{k_c}{m_b} x_{imax}^5 - \left[p_2 \frac{Q_\varphi}{m_b} \cos\left(\frac{\theta_b}{2}\right)\right]^2 x_{imax}^2 - \quad (2)$$

$$2(r_b \omega_f \sin\theta_b)^2 \left[p_2 \frac{Q_\varphi}{m_b} \cos\left(\frac{\theta_b}{2}\right)\right] x_{imax} - (r_b \omega_f \sin\theta_b)^4 = 0$$

where $x_{imax}$ is a maximum deflection of the ball in mm;

$$k_c = 4E_{eq}^2 \frac{\sqrt{r_{eq}}}{3} \quad (3)$$

$$E_{eq} = \frac{E}{1 - v^2} \quad (4)$$

where v is Poisson's ratio associated with a material of the bearing, E is Young's modulus associated with material, and $E_{eq}$ is equivalent stiffness of the material. For example, if the bearing is made of EN31 steel, the Poisson's ratio is 0.3 and Young's modulus is 210 GPa.

$$r_{eq} = 0.5098 * r_{ball} \quad (5)$$

where $r_{ball}$ is the radius of the ball $$Q_\varphi = \text{Load} * 4.37 \quad (6)$$

$$\theta_b = \sin^{-1} \frac{\text{defect size}}{2r_{ball}} \quad (7)$$

$$\theta_a = \sin^{-1} \frac{\text{defect size}}{2r_{bearing}} \quad (8)$$

where $r_{bearing}$ is a radius of the bearing given by:

$$r_{bearing} = d_m + \text{internal clearance}/2 \quad (9)$$

$$\omega_f = \sqrt[2]{\frac{10 Q_\varphi (\theta_b - \theta_a) \sin\frac{\theta_b}{2}}{7} + \omega^2} \quad (10)$$

where ω is angular velocity is the angular frequency with which the ball rotates about the edge of the defect.

In the above equation, parameters p1 and p2 are tuned based on the bearing parameters. In an embodiment, the parameters are tuned using a trained machine learning model. The trained machine learning model is an evolutionary algorithm. The mathematical model is further solved for $x_{imax}$. Further, the maximum impact force $F_{max}$ on the ball is calculated from $x_{imax}$ according to the following equation:

$$F_{max} = k_c x_{imax}^{3/2} \quad (11)$$

$F_{max}$ represents, for example, the value of maximum impact force on the ball calculated mathematically. The maximum impact force is thus computed for the bearing corresponding to each of the operating conditions. Similarly, the maximum impact forces are computed for each of the three bearings in each of the operating conditions.

The apparatus 320 further builds the virtual model of the bearing based on the simulation data, the experimental data, and the mathematical data. In one embodiment, the virtual model is a surrogate model. The virtual model is further validated based on test data generated using the experimental set up 300. The test data includes a set of operating conditions of the bearing including known values of defect size, angular velocity, and load. The output of the force sensor is compared to the output of the virtual model in order to detect an error associated with the virtual model. Further, parameters of the virtual model are tuned in order to minimize the error. The tuned virtual model may be used to predict the maximum impact force associated with any bearing for any given set of operating conditions.

Figure 5:
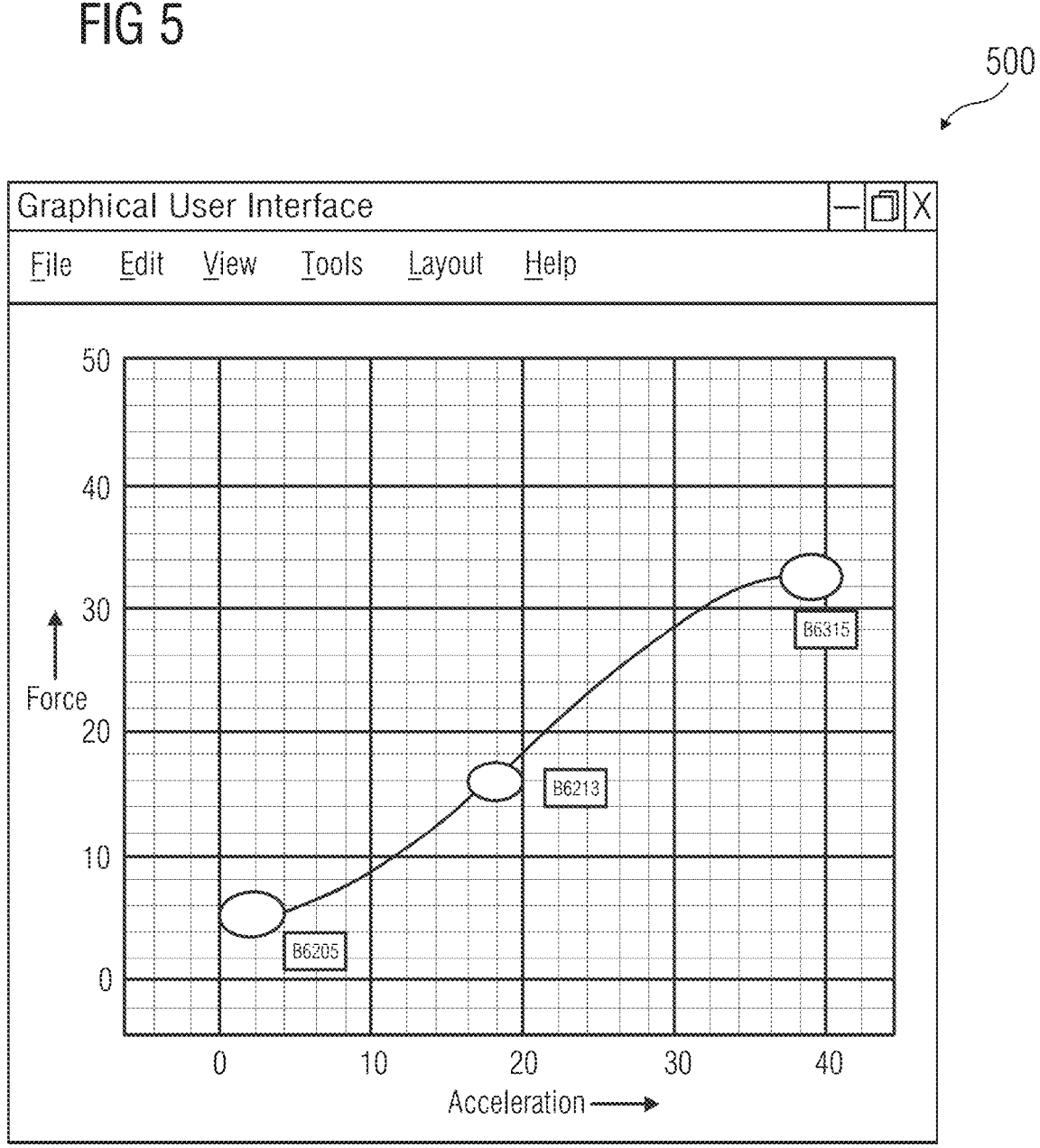
FIG. 5 is a Graphical User Interface view showing a representation of a relationship between maximum impact force and acceleration values associated with three bearings, in accordance with an embodiment.

FIG. 5 is a Graphical User Interface (GUI) view 500 showing a representation of a relationship between maximum impact force and acceleration values associated with three bearings, in accordance with an embodiment. The relationship has been obtained based on behavior of three bearings for a similar set of operating conditions. The three bearings have standard bearing numbers 6205, 6213 and 6319.

Figure 6:
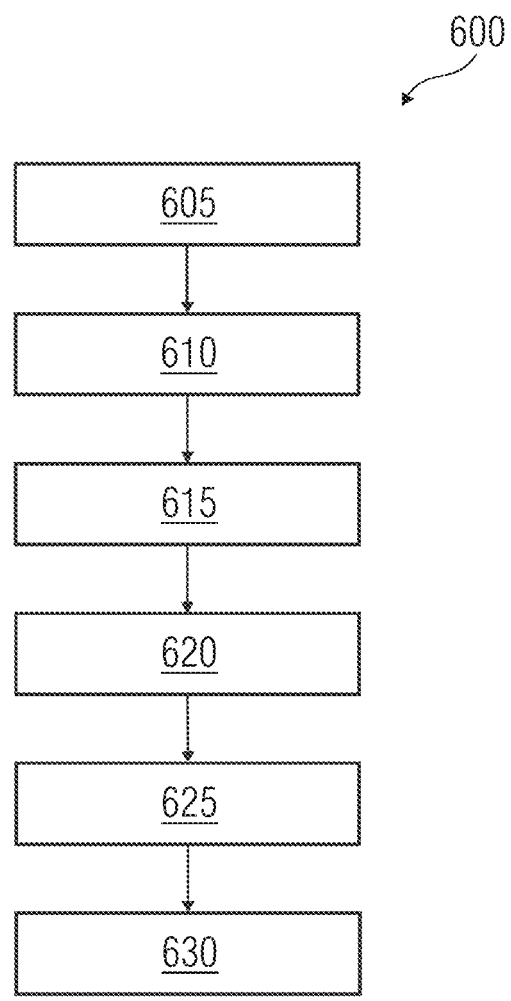
FIG. 6 depicts a flowchart of a method for estimating remaining useful life of the bearing, in accordance with an embodiment.

FIG. 6 depicts a flowchart of a method 600 for estimating remaining useful life of a bearing, in accordance with an embodiment.

At act 605, a request for analyzing a defect in the bearing is received by the processing unit 135. The request includes one or more bearing parameters associated with the bearing received from a client device, similar to client device 130, along with sensor data received from at least one sensing unit attached to the bearing. The sensor data may include output of the at least one sensing unit associated with the bearing. Both the client device and the at least one sensing unit are communicatively coupled to an edge device, similar to edge device 115. In the present embodiment, the at least one sensing unit includes an accelerometer mounted on a bearing housing associated with the bearing. The output of the at least one sensing unit is an acceleration signal in time domain.

Figure 7:
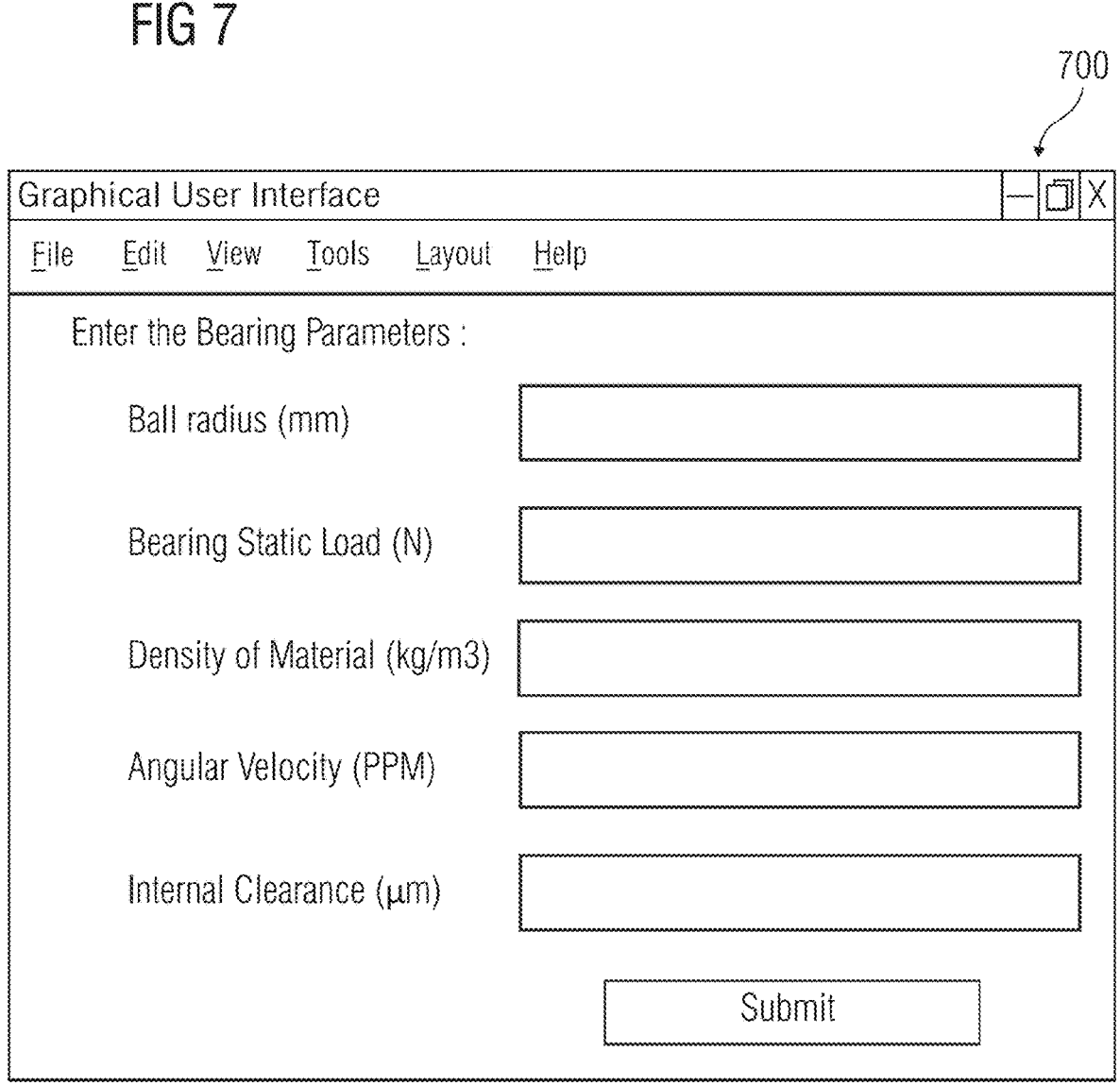
FIG. 7 is an exemplary web-based interface that enables a user to provide values for the one or more bearing parameters from a client device, in accordance with an embodiment.

In an implementation, a user may initiate the request by providing the one or more bearing parameters through a web-based interface provided on the client device. For example, the one or more bearing parameters include ball radius, bearing static load, density of material, angular velocity, and internal clearance. FIG. 7 illustrates an exemplary web-based interface 700 that enables a user to provide values for the one or more bearing parameters from a client device, in accordance with an embodiment.

In one embodiment, one or more of the bearing parameters are specified through a standard bearing number based on an international standard such as ISO dimensional series. For example, if the standard bearing number is 6213, the size of the bearing in mm is 65×120×23, where 65 mm is a diameter of the inner race, 120 mm is a diameter of the outer race, and 23 mm is a width of the bearing. The web-based interface may provide a drop-down menu for selecting a bearing number from a plurality of bearing numbers. In the present example, the bearing number may be selected as 6319.

Based on the bearing number, dimensions such as the ball radius and the bearing diameter may be automatically populated on the web-based interface. Similarly, the web-based interface may also provide the user an option to manually enter the bearing parameters if the bearing number is not displayed in the drop-down menu. Further, the user may confirm the values of the one or more bearing parameters by pressing a 'submit' button on the web-based interface to initiate the request. In an embodiment, the sensor data corresponds to real-time operating conditions of the bearing.

At act 610, an impact of the defect on the bearing over a period of time is monitored. The impact of the defect is monitored based on anomalies present within the sensor data.

Figure 8:
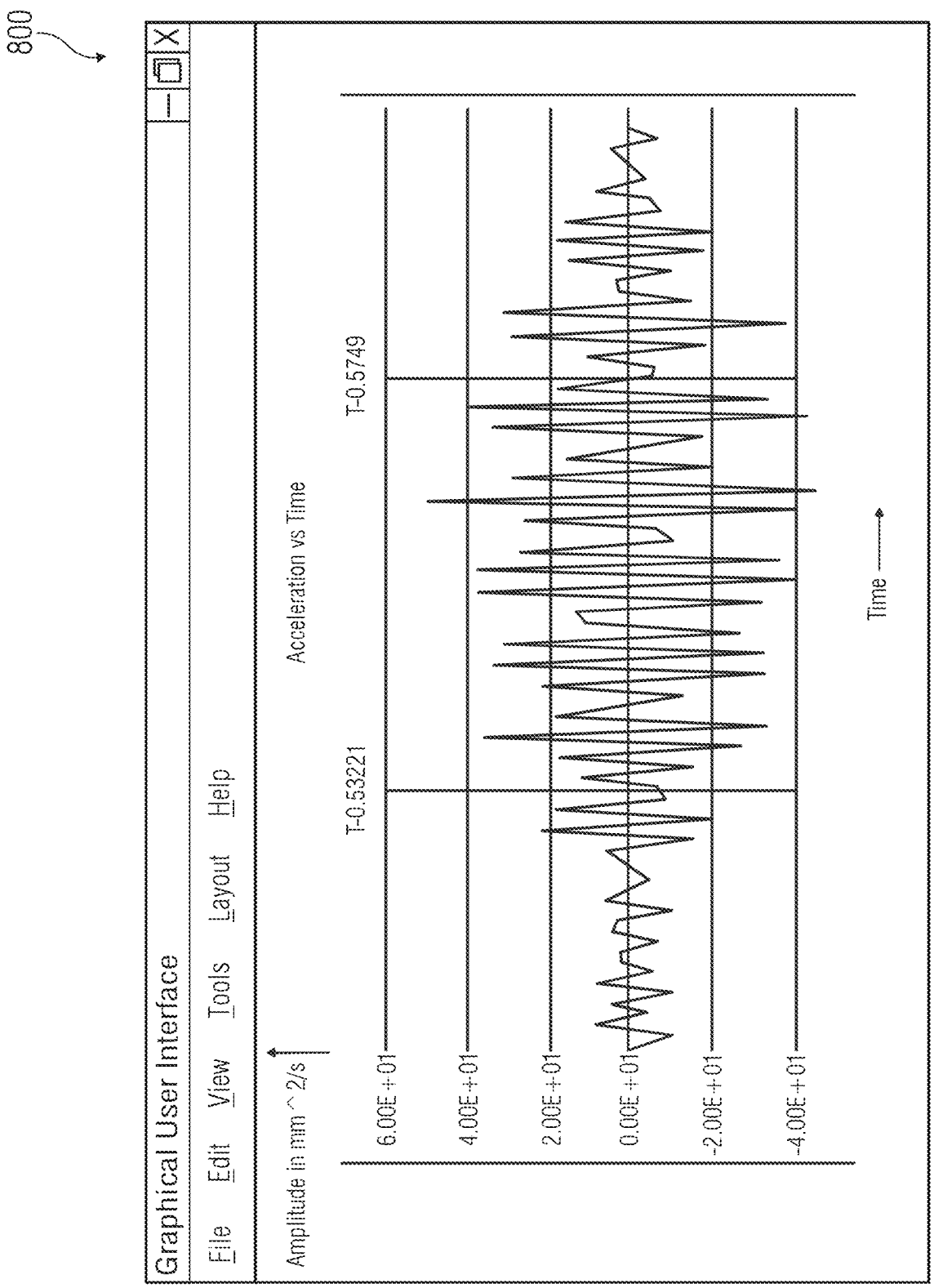
FIG. 8 is a Graphical User Interface view showing an example of an acceleration signal in time-domain, in accordance with an embodiment.

The anomalies may be indicated by features of signals generated by the at least one sensing unit. The features may include, but are not limited to, amplitude, frequency, harmonics, spectral energy, RMS velocity, presence of shock pulses or transients, repetitive pulses, and the like. In the present embodiment, the sensor data includes an acceleration signal in time-domain. FIG. 8 illustrates a GUI 800 showing an example of an acceleration signal in time-domain, in accordance with an embodiment. The impact may be identified from the acceleration signal using envelope analysis. More specifically, an envelope of the acceleration signal is generated through amplitude demodulation. For example, amplitude of the envelope may indicate periodic impacts of the defect. Upon identifying presence of such an impact, act 615 is performed.

At act 615, a time period during which the impact of the defect on the bearing is higher than a threshold range is determined using a machine learning model. The time period is indicative of a time taken by the rolling element of the bearing to cross the defect. More specifically, the time period indicates a time duration in which the rolling element enters and leaves the defect. The threshold range may be predefined by the operator or may be based on specifications provided by a manufacturer of the bearing. For example, the threshold value may be defined as 2 mm$^2$/s. Based on an outcome of the envelope analysis, if the amplitude of the acceleration signal crosses the threshold value, then the time period during which the amplitude of the amplitude of the envelope is greater than 2 mm$^2$/s is identified.

In an embodiment, the machine learning model may be a Convolutional Neural Network (CNN) model. The CNN model is a trained CNN configured for identifying the time duration. More specifically, the CNN is configured to identify start and end times associated with the time duration. The time duration corresponds to the time taken by a ball to cross the defect. For example, in the time-domain acceleration signal of FIG. 8, the time duration is from t1=0.53221 until t2=0.5749. Therefore, time duration t defect is calculated as:

$t_{defect} = t2 - t1 = 0.0427$ seconds

At act 620, a severity of the impact associated with the defect during the time period is computed. The severity of the defect is determined as a defect size associated with the defect. The defect size is determined from the time duration computed in act 615. In one embodiment, the defect size may be calculated based on predefined mathematical relations. For example, the time duration $t_{defect}$ is used to compute an angular distance $\theta_{center}$ travelled by the ball using the following mathematical relation:

$\theta_{center} = \omega_{cage} * t_{defect}$ (12)

where, $$\omega_{cage} = \frac{\omega}{2}\left(1 - \left(\frac{d}{D}\cos\alpha\right)\right)$$ (13)

where, ω is an angular velocity of a rotating shaft on which the bearing is mounted. ω may also be considered as angular velocity of the inner race of the bearing during operation. D is the diameter of the outer race, d is the diameter of the inner race, and α is the angle of contact between the ball and the outer race. For example, if the cage velocity is calculated as 63.227 deg/s through equation (13), $\theta_{center} = 63.227$ deg/s*0.0427 s=2.67 degrees Further, the defect size is computed as:

$d_{defect} = \theta_{center} \cdot R$ (14)

where R is the radius of the outer race (e.g., R=D/2). In case of a 6319 bearing, the diameter D of the outer race is 200 mm. Therefore, in the present example, $$d_{defect} = 2.67 * 100 * \frac{\pi}{180} = 4.66 \text{ mm}$$

The accuracy of the value of the defect size computed herein depends on the accuracy of the machine learning model used to determine the time duration $t_{defect}$. The experimental test set-up 300 may be used to train and/or validate the machine learning model to accurately predict the time duration $t_{defect}$ from an acceleration signal. More specifically, time-series data associated with the acceleration signals corresponding to known defect sizes are used for training and validating the machine learning model. During validation, a defect size computed based on the output of the machine learning model is compared with the actual or known defect size to determine an error in the model. If the computed defect size deviates from the known defect size, the machine learning model is tuned in order to minimize the error.

At act 625, a remaining useful life of the bearing is determined based on the severity and the operational data during the time period. In an example, the remaining useful life may be expressed as number of revolutions before the failure occurs. In another example, the remaining useful life is expressed as number of operating hours at a constant speed before the failure. In an embodiment, the remaining useful life model for the bearing is configured based on the following rating life model:

$$L_{10} = a_1 a_{iso}\left(\frac{C}{P}\right)^3$$ (15)

where $a_{iso}$ is a life modification factor based on systems approach for life calculation given by:

$$a_{iso} = f\left(\frac{e_c C_u}{P}, K\right)$$ (16)

where, $a_1$ is a life modification factor for reliability, $C_u$ is fatigue load limit in Newtons, $e_c$ is a contamination factor specific to the defect size, P is dynamic equivalent radial load in Newtons, C is dynamic equivalent radial load rating, and K is viscosity ratio. The dynamic parameter used for configuring the rating life model may be the dynamic equivalent radial load.

The life modification factor for reliability is a predefined value specified in ISO 281:2007 for a given value of reliability. For example, if the reliability may be considered to be 90%, a1 is taken as 1. The value of reliability is taken as 90% by default. In an embodiment, the value of reliability may be modified by an operator through the client device.

The life modification factor for reliability may be further obtained from a first lookup table stored in the database 195, based on the value of reliability. The fatigue load limit and the dynamic equivalent radial load rating are obtained from the one or more bearing parameters associated with the bearing.

The contamination factor is determined based on the defect size. This is because defects in the bearing result in removal of small, discrete particles of material from the structure of the bearing. These discrete particles increase the concentration of contaminants inside the bearing. The concentration of contaminations further increases with increase in the defect size. The defect size is provided as input to a trained classification model that classifies the defect size into one of a plurality of severity levels. For example, the plurality of severity levels may correspond to 'normal cleanliness', 'slight to typical contamination', 'severe contamination', and 'very severe contamination'. Based on the defect size, the trained classification model outputs a severity level. The severity level thus determined is further used to select an appropriate contamination factor from a second lookup table stored in the database 195. The second lookup table may include values of contamination factor corresponding to each of the severity levels. The classification model may be trained to classify the defect size into one of any number of severity levels.

The viscosity ratio is indicative of a lubrication condition of the bearing during operation. The viscosity ratio is calculated as the ratio of an operating viscosity of the lubricant to a rated viscosity of the lubricant. The operating viscosity is calculated based on a viscosity grade of the lubricant and an operating temperature. The viscosity grade of the oil may be obtained from a third look up table including viscosity grades corresponding to different types of lubricants. In one embodiment, the operating temperature of the bearing may be obtained from temperature sensors associated with the bearing. In another embodiment, a virtual model of the bearing may be used to determine a thermal profile of the bearing based on the sensor data. The rated viscosity is obtained from a fourth look up table based on dimensions of the bearing and angular velocity of the bearing.

The equation (15) for rating life model may be rearranged as below:

$$L_{10} = a_1 f\left(\frac{e_c C_u}{P}, K\right)\left(\frac{C}{P}\right)^3 \quad (17)$$

The dynamic equivalent radial load P may be the same as the maximum impact force computed by the virtual model based on the sensor data. Therefore, the remaining useful life is a function of the dynamic equivalent radial load P. As the virtual model determines the maximum impact force based on the mathematical model, the experimental data and the simulation data, $$P = G\left\{\left(p_1 \frac{k_c}{m_b} x_{imax}^5 - \left[p_2 \frac{Q_\varphi}{m_b}\cos\left(\frac{\theta_b}{2}\right)\right]^2 x_{imax}^2 - \right.\right. \quad (18)$$
$$\left.\left. 2(r_b \omega_f \sin\theta_b)^2 \left[p_2 \frac{Q_\varphi}{m_b}\cos\left(\frac{\theta_b}{2}\right)\right] x_{imax} - (r_b \omega_f \sin\theta_b)^4 = 0\right),\right.$$
$$\text{simulation data, experimental data}\right\}$$

Therefore, the remaining useful life model is configured as below:

$$L_{RUL} = \quad (19)$$
$$a_1 f\left(\frac{e_c C_u}{PG\left\{\left(p_1 \frac{k_c}{m_b} x_{imax}^5 - \left[p_2 \frac{Q_\varphi}{m_b}\cos\left(\frac{\theta_b}{2}\right)\right]^2 x_{imax}^2 - \atop 2(r_b \omega_f \sin\theta_b)^2 \left[p_2 \frac{Q_\varphi}{m_b}\cos\left(\frac{\theta_b}{2}\right)\right] x_{imax} - \atop (r_b \omega_f \sin\theta_b)^4 = 0\right), \text{simulation data, experimental data}\right\}}, K\right)\left(\frac{C}{P}\right)^3$$

Based on the equation (19), the remaining useful life (RUL) of the bearing is calculated.

Figure 9:
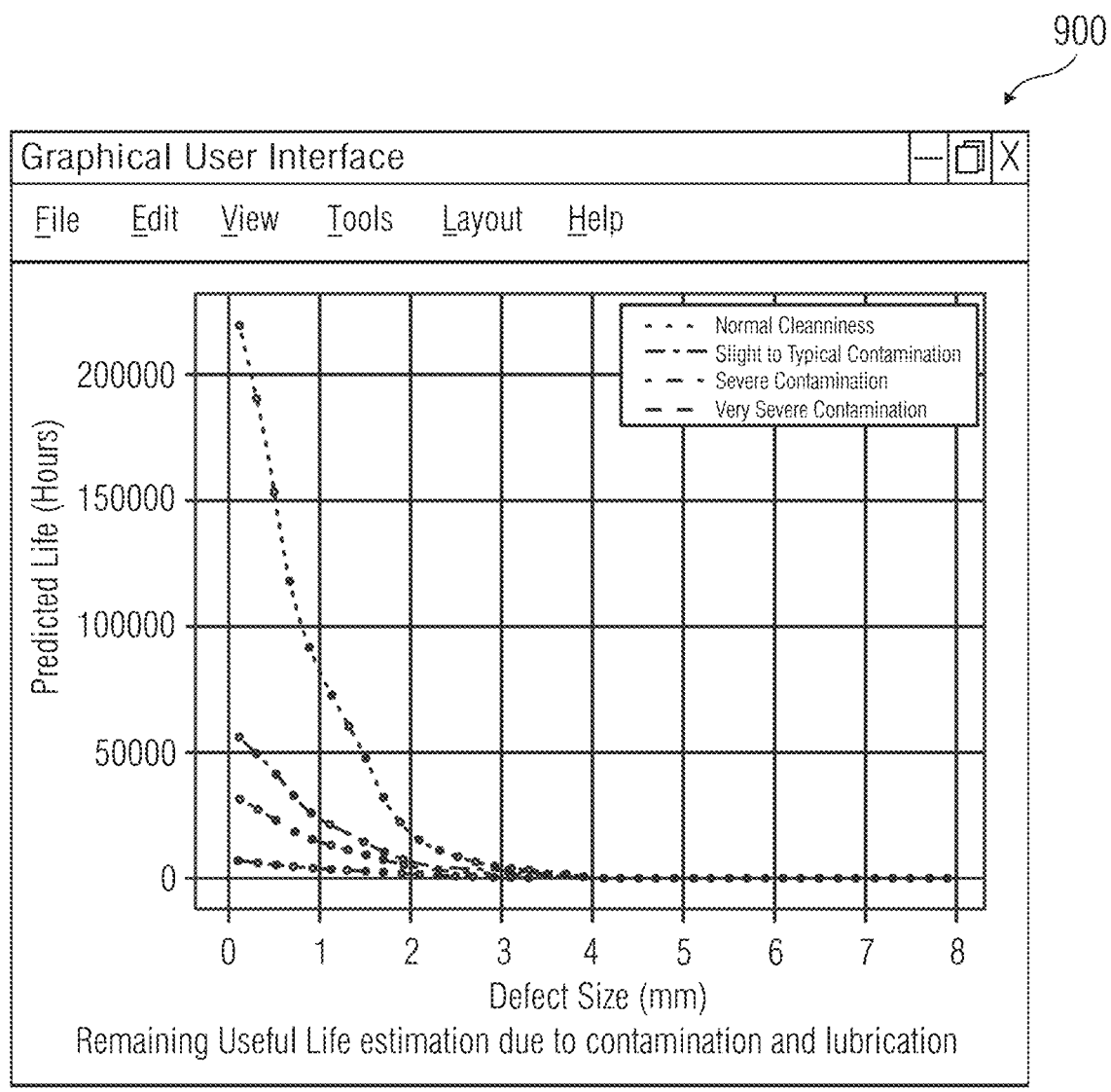
FIG. 9 is a Graphical User Interface view showing degradation in remaining useful life with increasing defect size, in accordance with an embodiment.

At act 630, a notification indicating the remaining useful life of the bearing is generated on an output device. The output may be a notification that indicates the remaining useful life of the bearing as a dynamically changing parameter, based on real-time sensor data. For example, the notification may include a message 'The remaining useful life of bearing 6319 is 56 hours'. The RUL value may be further indicated on an RUL curve as shown in FIG. 9. FIG. 9 is a GUI view 900 showing degradation in remaining useful life (shown as predicted life in hours) with increasing defect size, in accordance with an embodiment. The GUI view 900 also shows degradation in the remaining useful life for different severity levels of contamination, as shown. The plots corresponding to different severity levels are generated by substituting contamination factors corresponding to each of the severity level in the rating life model of equation (15) with progressive increase in the defect size.

The present embodiments facilitate accurate calculation of remaining useful life of a bearing based on defect size computed from real-time sensor data.

The present embodiments are not limited to a particular computer system platform, processing unit, operating system, or network. One or more aspects of the present embodiments may be distributed among one or more computer systems (e.g., servers configured to provide one or more services to one or more client computers, or to perform a complete task in a distributed system). For example, one or more aspects of the present embodiments may be performed on a client-server system that includes components distributed among one or more server systems that perform multiple functions according to various embodiments. These components include, for example, executable, intermediate, or interpreted code that communicate over a network using a communication protocol. The present embodiments are not limited to be executable on any particular system or group of system, and is not limited to any particular distributed architecture, network, or communication protocol.

While the invention has been illustrated and described in detail with the help of exemplary embodiments, the invention is not limited to the disclosed examples. Other variations may be deducted by those skilled in the art without leaving the scope of protection of the claimed invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for estimating remaining useful life of a bearing, the computer-implemented method comprising:
receiving, by a processing unit, a request for analyzing a defect in the bearing from a source, wherein the request comprises operational data associated with the bearing;
monitoring an impact of the defect on the bearing over a period of time;
determining a time period during which the impact of the defect on the bearing is higher than a threshold range using a machine learning model, the time period being indicative of a time duration in which the bearing enters and leaves the defect;
computing a severity of the impact associated with the defect during the time period by computing a defect size corresponding to the defect based on a duration of the time period;
determining, using a virtual model of the bearing, a remaining useful life of the bearing based on the severity and the operational data during the time period, wherein the virtual model is generated based on simulation data, experimental data, mathematical data, or any combination thereof associated with a plurality of other bearings; and
generating a notification indicating the remaining useful life of the bearing on an output device.

2. The method of claim 1, wherein the operational data comprises an output of at least one sensing unit associated with the bearing in real-time.

3. The method of claim 1, wherein monitoring the impact of the defect on the bearing over a period of time comprises:
monitoring anomalies in the output of the at least one sensing unit.

4. The method of claim 1, wherein determining the time period during which the impact of the defect on the bearing is higher than a threshold range using the machine learning model comprises:
analyzing the operational data associated with the bearing using the machine learning model for determining the time period.

5. The method of claim 1, wherein determining the remaining useful life of the bearing based on the severity and the operational data during the time period comprises:
computing a dynamic parameter associated with the bearing based on the defect size and the operational data using the virtual model of the bearing;
configuring a remaining useful life model of the bearing based on the dynamic parameter; and
computing the remaining useful life of the bearing based on the configured remaining useful life model and the operational data.

6. An apparatus for estimating remaining useful life of a bearing, the apparatus comprising:
one or more processing units; and
a memory unit communicatively coupled to the one or more processing units, wherein the memory unit comprises a bearing management module stored in the form of machine-readable instructions executable by the one or more processing units to estimate remaining useful life of a bearing, the machine-readable instructions comprising:
receiving, by the one or more processing units, a request for analyzing a defect in the bearing from a source, wherein the request comprises operational data associated with the bearing;
monitoring an impact of the defect on the bearing over a period of time;
determining a time period during which the impact of the defect on the bearing is higher than a threshold range using a machine learning model, the time period being indicative of a time duration in which the bearing enters and leaves the defect;
computing a severity of the impact associated with the defect during the time period by computing a defect size corresponding to the defect based on a duration of the time period;
determining, using a virtual model of the bearing, a remaining useful life of the bearing based on the severity and the operational data during the time period, wherein the virtual model is generated based on simulation data, experimental data, mathematical data, or any combination thereof associated with a plurality of other bearings; and
generating a notification indicating the remaining useful life of the bearing on an output device.

7. A system for estimating remaining useful life of a bearing, the system comprising:
one or more sources configured to provide operational data associated with the bearing; and
an apparatus communicatively coupled to the one or more sources, wherein the apparatus is configured to estimate remaining useful life of the bearing based on the operational data, the estimation of the remaining useful life of the bearing comprising:
receipt, by a processing unit, a request for analysis of a defect in the bearing from a source, wherein the request comprises operational data associated with the bearing;
monitor of an impact of the defect on the bearing over a period of time;
determination of a time period during which the impact of the defect on the bearing is higher than a threshold range using a machine learning model, the time period being indicative of a time duration in which the bearing enters and leaves the defect;
computation of a severity of the impact associated with the defect during the time period by computation of a defect size corresponding to the defect based on a duration of the time period;
determination, using a virtual model of the bearing, of a remaining useful life of the bearing based on the severity and the operational data during the time period, wherein the virtual model is generated based on simulation data, experimental data, mathematical data, or any combination thereof associated with a plurality of other bearings; and
generation of a notification indicating the remaining useful life of the bearing on an output device.

8. In a non-transitory computer-readable storage medium that stores instructions executable by a data-processing system to estimate remaining useful life of a bearing, the instructions comprising:

receiving, by a processing unit, a request for analyzing a defect in the bearing from a source, wherein the request comprises operational data associated with the bearing; monitoring an impact of the defect on the bearing over a period of time;

determining a time period during which the impact of the defect on the bearing is higher than a threshold range using a machine learning model, the time period being indicative of a time duration in which the bearing enters and leaves the defect;

computing a severity of the impact associated with the defect during the time period by computing a defect size corresponding to the defect based on a duration of the time period;

determining, using a virtual model of the bearing, a remaining useful life of the bearing based on the severity and the operational data during the time period, wherein the virtual model is generated based on simulation data, experimental data, mathematical data, or any combination thereof associated with a plurality of other bearings; and generating a notification indicating the remaining useful life of the bearing on an output device.

9. The non-transitory computer-readable storage medium of claim 8, wherein the operational data comprises an output of at least one sensing unit associated with the bearing in real-time.

10. The non-transitory computer-readable storage medium of claim 8, wherein monitoring the impact of the defect on the bearing over a period of time comprises:

monitoring anomalies in the output of the at least one sensing unit.

11. The non-transitory computer-readable storage medium of claim 8, wherein determining the time period during which the impact of the defect on the bearing is higher than a threshold range using the machine learning model comprises:

analyzing the operational data associated with the bearing using the machine learning model for determining the time period.

12. The non-transitory computer-readable storage medium of claim 8, wherein determining the remaining useful life of the bearing based on the severity and the operational data during the time period comprises:

computing a dynamic parameter associated with the bearing based on the defect size and the operational data using the virtual model of the bearing;

configuring a remaining useful life model of the bearing based on the dynamic parameter; and computing the remaining useful life of the bearing based on the configured remaining useful life model and the operational data.

* * * * *